United States Patent [19]

Nicolas

[11] Patent Number: 5,768,522
[45] Date of Patent: Jun. 16, 1998

[54] SYSTEM AND METHOD FOR A MULTIPLE STATE, MULTIPLE CASE COUNTER

[75] Inventor: William Spiridon Nicolas, Plano, Tex.

[73] Assignee: MCI Communications Corporation, Washington, D.C.

[21] Appl. No.: 812,833

[22] Filed: Mar. 6, 1997

[51] Int. Cl.⁶ ........................................... G06F 17/00
[52] U.S. Cl. ......................................... 395/200.54
[58] Field of Search ................ 395/200.54, 200.5, 395/200.58, 200.57; 379/113, 115, 13, 196, 241

[56] References Cited

U.S. PATENT DOCUMENTS

| | | | |
|---|---|---|---|
| 5,473,596 | 12/1995 | Garafola et al. | 379/241 |
| 5,491,796 | 2/1996 | Wanderer et al. | 395/200.5 |
| 5,528,677 | 6/1996 | Butler et al. | 379/196 |
| 5,537,547 | 7/1996 | Chan et al. | 395/200.5 |
| 5,544,314 | 8/1996 | Fuchsreiter et al. | 395/200.54 |
| 5,687,223 | 11/1997 | Elliott et al. | 379/113 |

*Primary Examiner*—Ellis B. Ramirez

[57] ABSTRACT

A system and a method for a multiple state, multiple case counter circuit are disclosed. The counter circuit has a n position register, n being any integer. Each of the n position counts from 1 to 9. In one embodiment of the present invention, the register takes 9 states (state 1 to state 9). In another embodiment of the present invention, the register has 10 states (state 0 to state 9). Furthermore, the register takes n cases in each state. The counter circuit uses one of the n positions of the register to indicate a state of the register and uses the remaining (n−1) positions to count the NEs. The counter circuit counts $9 \times n \times (1^{n-1}-1)$ NEs when the register has 9 states. Likewise, the counter circuit counts $10 \times n \times (10^{n-1}-1)$ NEs when the register has 10 states.

7 Claims, 3 Drawing Sheets

SYSTEM AND METHOD FOR A MULTIPLE STATE, MULTIPLE CASE COUNTER

BACKGROUND OF THE INVENTION

1. Field of the Invention

The present invention relates generally to network management, and more specifically to a system and method for a multiple state, multiple case counter which may be used for keeping track of network elements in a network.

2. Related Art

Many industries rely on networks to serve customers. For example, telecommunication, computer, electric power, airline and other industries serve customers via networks.

In simple terms, a network is constructed by Network Elements (NEs). The NEs are building blocks of the network. Typically, in a network, the NEs are interconnected with each other via links, such as electric cables, fiber optics, satellite links, etc. The NEs are connected to a network management system which monitors the operations of the NEs.

When an industry expands its network, additional NEs are added to the network to accommodate growth. However, with increasing number of NEs in the network, it becomes difficult to monitor the operations of the NEs. Often the monitoring system used by the network limits the maximum number of NEs that can be added to the network and still be accurately monitored. Typically, this limit is set by the network management system which uses some type of algorithm to monitor the operations of the NEs.

For example, many service providers use NEs developed by vendors in their network. When a service provider expands its network, it adds additional NEs to its network. These NEs are generally monitored by a network management system which is also developed by a vendor and is provided to the service provider. Unfortunately, the network management system provided by the vendor limits the maximum number of NEs that can be added to the network and monitored by it. For example, in some vendor provided network management systems, a five position register (where each position can count from 0 to 9) is used to keep track of the number of NEs in the network. Although a five position register in a network management system can theoretically monitor up to 99999 NEs, due to artificial restrictions, the maximum number of potential NEs that can be monitored is actually only around 32000. Thus, expansion of the subscriber's network is limited to 32000 NEs due the limit set by the network management system provided by the vendor.

SUMMARY OF THE INVENTION

Briefly stated, the present invention is a system and method for keeping track of the number of, for example, network elements NEs) in a network by a counter circuit. The counter circuit has a n position register. Each of the n positions can take values from 0 to 9. In one embodiment of the present invention, the register can take 9 states (state 1 to state 9). In another embodiment of the present invention, the register can take 10 states (state 0 to state 9). Each state has n cases. The present invention uses one of the n positions to indicate the state of the register and uses the remaining (n−1) positions to maintain a relative count. In each case, the counter circuit can count up to $10^{n-1}-1$ NEs. Thus, given n cases per state, the counter circuit can count up to $n \times (10^{n-1}-1)$ NEs for a state. Assuming that the register takes 9 states, the counter circuit can count up to a total of $9 \times n \times (10^{n-1}-1)$ NEs.

Further features and advantages of the invention are described in detail below with reference to the accompanying drawings.

BRIEF DESCRIPTION OF THE FIGURES

The present invention will be described with reference to the accompanying drawings, wherein.

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

Figure 1:
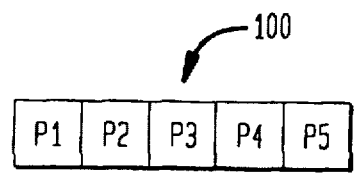
FIG. 1 illustrates a five position register.

1. Overview and Discussion of the Invention

The present invention is directed toward a system and a method for a multiple state, multiple case counter which may be used for keeping track of network elements (NEs) in a network. The NEs in the network are counted by a counter circuit having a register. The register has n positions, where each position can preferably count from 0 to 9. According to one embodiment of the present invention, the register has 9 states (state 1 to state 9). In another embodiment, the register has 10 states (state 0 to state 9). Each state has n cases. One position of the register is used to indicate the state. The value of this position identifies the current state (for example, if the value of this position is 3, then the state is three). The position that is used to indicate the state is used to designate the current case of the state. Since there are n positions in the register to indicate the state, each state has n cases.

According to the present invention, n−1 positions of the register are used to indicate the count (called the relative count) of the current case of the current state. Thus, for every case of every state, the register can count up to $(10^{n-1}-1)$. Every state has n cases. Thus, the maximum count for each state is $n \times (10^{n-1}-1)$. Thus, if the register has 9 states (state 1 to state 9), it can count up to $9 \times n \times (10^{n-1}-1)$. Likewise, if the register takes 10 states (state 0 to state 9), it can count up to $10 \times n \times (10^{n-1}-1)$. Assume that n is equal to 5 and the register takes 9 states (state 1 to state 9). Then, according to the present invention, the register can count up to 9×5×9999, or 449955. This is much greater than the conventional use of a 5 position register, which can count up to only 99999. Thus, by using a register in the manner of the present invention, it is possible to have a network with a much greater capacity for network elements.

The operation of the present invention shall now be described in greater detail by use of an example. Assume that a five position register 100 shown in FIG. 1 is used to keep track of the number of NEs in a network. Also assume that the register 100 takes 9 states (state 1 to state 9). Each position can count from 0 to 9. Since n=5, each of the 9 states has 5 cases.

Assume that, when position P1 is used to indicate the state, the case for the state is 1. When position P2 is used to indicate the state, the case for the state is 2. When position P3 is used to indicate the state, the case for the state is 3.

When position P4 is used to indicate the state, the case for the state is 4. When position P5 is used to indicate the state, the case for the state is 5. In any given case, the other 4 positions are used to indicate the count (called the relative count).

The register 100 is initialized at state=1, case=1, count=0. This is shown in Scenario 1 (the asterisk indicates which position is being used to indicate the state). The state is 1 because position P1 is being used to indicate the state. The state is 1 because the value of position P1 is 1. The count is 0 because the remaining positions P2–P4 are all 0.

| *P1 = 1 | P2 = 0 | P3 = 0 | P4 = 0 | P5 = 0 |

Scenario 1

Scenario 2 illustrates the state of the register 100 after being incremented by 1 (according to the preferred embodiment of the invention, the count is increased to indicate the addition of a network element into the network). The state is 1, the case is 1, and the count is 1. It is assumed that the right most position being used to indicate the count (i.e., P5) is the least significant position of the count, and the left most position being used to indicate the count (i.e., P2) is the most significant position of the count (this is true, irrespective of which position is being used to indicate the state).

| *P1 = 1 | P2 = 0 | P3 = 0 | P4 = 0 | P5 = 1 |

Scenario 2

Scenario 3 illustrates the state of the register 100 after being incremented again by 1. The state is 1, the case is 1, and the relative count is 2.

| *P1 = 1 | P2 = 0 | P3 = 0 | P4 = 0 | P5 = 2 |

Scenario 3

While in case 1 of state 1, the relative count will continue to increase up to 9999. This is shown in Scenario 4.

| *P1 = 1 | P2 = 9 | P3 = 9 | P4 = 9 | P5 = 9 |

Scenario 4

When the register 100 is next incremented, the state will remain 1, but the case will change to 2. This is done by using position P2 to indicate the case of state 1. As a matter of fact, two steps are involved when a current case is changed to a next case. First, all the remaining positions (except the position which is used to indicate the case) are initialized to 0. Next, the least significant position is incremented by 1 to indicate the addition of a new NE to the network. This is shown in Scenario 5.

| P1 = 0 | *P2 = 1 | P3 = 0 | P4 = 0 | P5 = 1 |

Scenario 5

While in case 2 of state 1, the count will increase up to 9999. This is shown in Scenario 6.

| P1 = 9 | *P2 = 1 | P3 = 9 | P4 = 9 | P5 = 9 |

Scenario 6

When the register 100 is next incremented, the state will remain 1, but the case will change to 3. As described before, a two step procedure is followed since the current case is changed to the next case. First, all four positions that are used to indicate the relative count are initialized to 0. Next, the least significant position of those four positions is incremented by 1 to indicate the addition of a new NE to the network.

In case 3 of state 1, the relative count will increase up to 9999. When the register 100 is next incremented, the state will remain 1, but the case will change to 4. While in case 4 of state 1, the relative count will increase up to 9999. When the register 100 is next incremented, the state will remain 1, but the case will change to 5. While in case 5 of state 1, the relative count will increase up to 9999. This is shown in Scenario 7.

| P1 = 9 | P2 = 9 | P3 = 9 | P4 = 9 | *P5 = 1 |

Scenario 7

Scenario 7 illustrates the maximum value of state 1. When the register 100 is next incremented, the state changes to 2. The case resets to 1. The relative count is first initialized to 0. Next, the relative count is incremented by 1 to indicate the addition of a new NE. This is shown in Scenario 8.

| *P1 = 2 | P2 = 0 | P3 = 0 | P4 = 0 | P5 = 1 |

Scenario 8

The maximum value of the register 100 according to the present invention is when the state is 9, the case is 5, and the relative count is 9999. This is shown in Scenario 9.

| P1 = 9 | P2 = 9 | P3 = 9 | P4 = 9 | *P5 = 9 |

Scenario 9

At any time, register 100 has a relative count and an absolute count. The relative count is the count that is relative to the current case of the current state. For example, the relative count of Scenario 9 is 9999. The relative count of Scenario 3 is 2.

The absolute count is the count of the register 100 when taking into account the state and the case. At any given time, the absolute count is given by Equation 1:

$$\begin{aligned} \text{Absolute Count} &= \text{Counts in Prior States and Cases} + \text{Relative Count} \\ &= (\text{state} - 1) \times n \times (10^{n-1} - 1) + (\text{case} - 1) \times (10^{n-1} - 1) + \text{Relative Count} \\ &= (10^{n-1} - 1)\,[n \times (\text{state} - 1) + (\text{case} - 1)] + \text{Relative Count} \end{aligned}$$

Equation 1

Where n is equal to 5, Equation 1 becomes:

$$\text{Absolute Count} = 9999[5 \times (\text{state} - 1) + (\text{case} - 1)] + \text{Relative Count}$$

Equation 2

For example, consider Scenario 10:

| P1 = 1 | P2 = 8 | *P3 = 5 | P4 = 2 | P5 = 3 |

Scenario 10

The state is 5 and the case is 3. The relative count is 1823. The absolute count is 9999|5×(5−1)+(3−1)|+1823, or 221801

In another embodiment of the present invention, the register has 10 states (state 0 to state 9). In that case, the Absolute Count is given by the equation:

$$(state) \times n \times (10^{n-1}-1) + (case-1) \times (10^{n-1}-1) + Relative\ Count.$$

Equation 3

2. Example Environment

Before describing the invention in detail, it is useful to describe an example environment in which the present invention can be implemented. In the broadest sense, the present invention can be implemented in any network management system used in a network. One such environment is a network management system in a telecommunication network.

Figure 2:
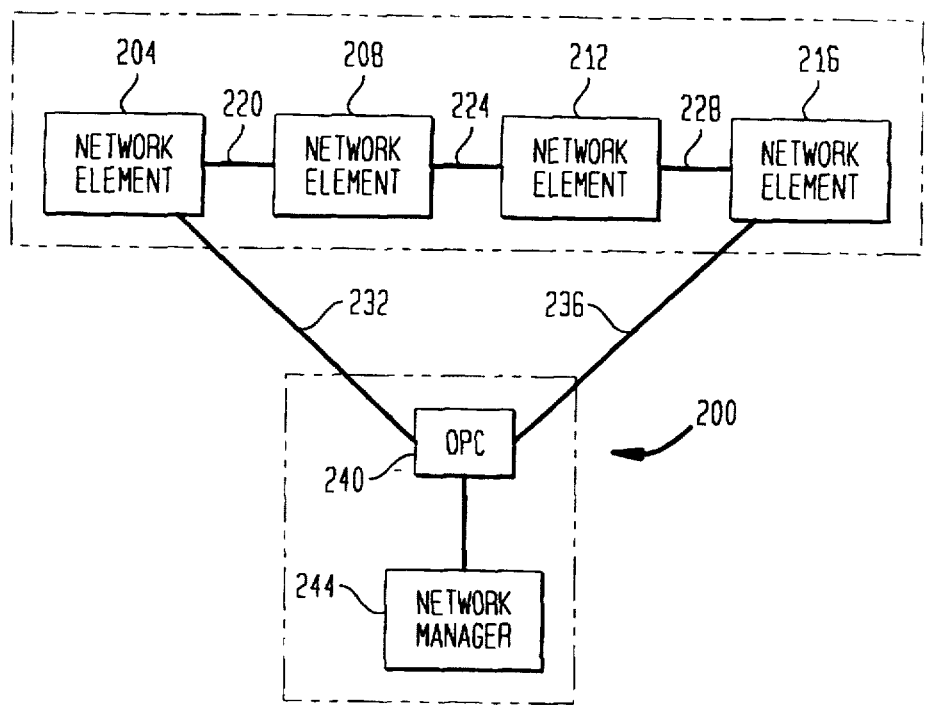
FIG. 2 illustrates a network management system.

FIG. 2 illustrates a network management system 200. The invention is also directed to the network management system 200 shown in FIG. 2. The network management system 200 includes NEs 204-216, links 220-228, connections 232 and 236, operation controller (OPC) 240 and a network manager 244. In the network management system 200, the OPC 240 is connected to the NEs 204-216 via the connections 232 and 236, respectively. The NEs 204-216 are interconnected by the links 220-228. The links 220-228 represent either intersite or intersite connections, and can be any well known communication medium.

In operation, the OPC 240 periodically interrogates a computer resident within each NE 204-216. The NEs 204-216 provide the OPC 240 with performance and status information. The OPC 240 then provides the collected information to the network manager 244.

In this example, the network management system 200 limits the number of NEs that can be added to the network and monitored by the network management system 200. Consequently, as a practical matter, this will limit the growth of the service provider's network.

Figure 3:
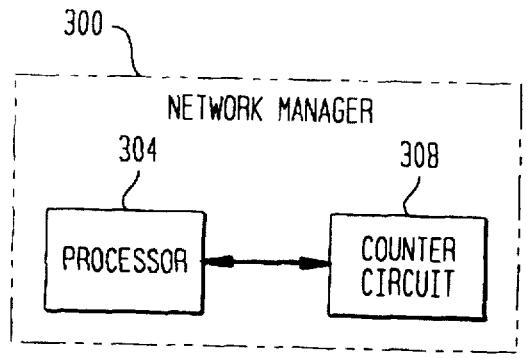
FIG. 3 illustrates a network manager according to one embodiment of the present invention.

FIG. 3 illustrates a network manager 300 according to one embodiment of the present invention. Specifically, the network manager 300 includes a processor 304 and a counter circuit 308. In operation, the network manager 300 tracks the number of NEs in the network using the processor 304 and the counter circuit 308.

Figure 4:
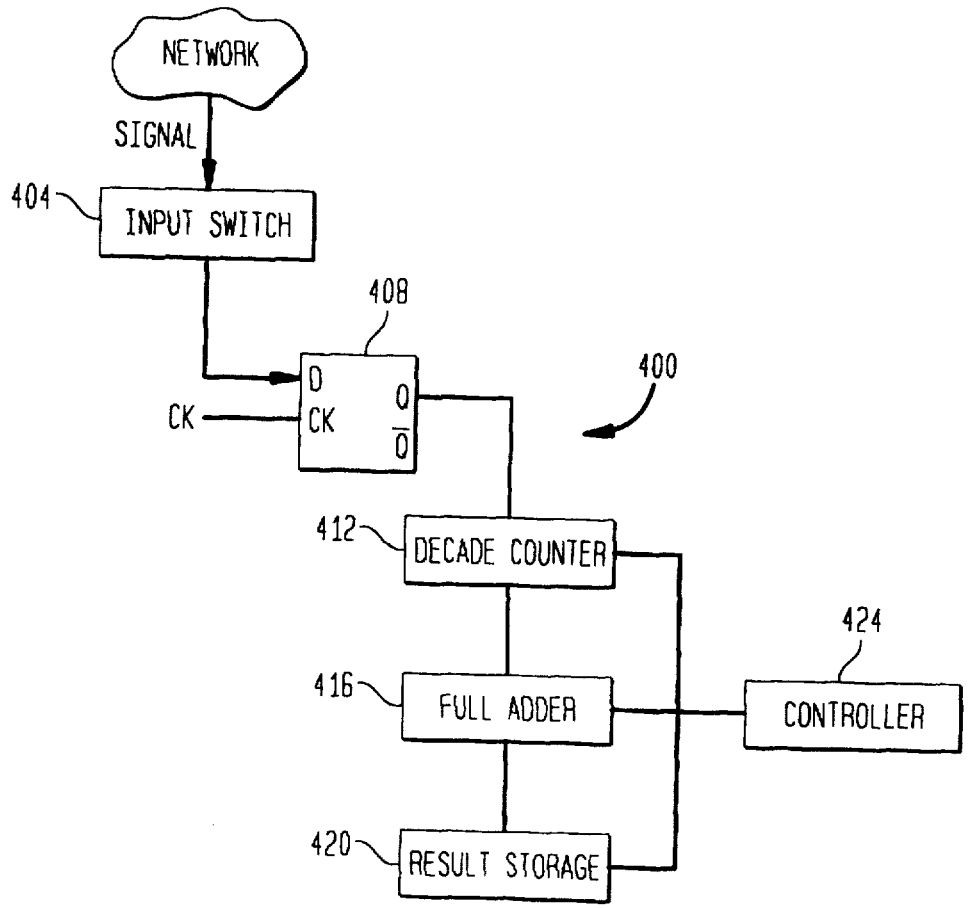
FIG. 4 illustrates an example embodiment of a counter circuit used in the network manager of FIG. 3.

FIG. 4 illustrates a counter circuit 400 used in the network manager 300 of FIG. 3. Specifically, the counter circuit 400 includes an input switch 404, a flip-flop 408 (also referred as a latch), a decade counter 412, a full adder 416, a result storage 420 and a controller 424 The decade counter 412 is actually a five position register.

Initially, the controller 424 initializes the decade counter to state=1, case=1 and count=0. When a NE is added to the network, the input switch 404 receives a signal. The input switch 404 relays the signal to the flip-flop 408. The flip-flop 408 receives the signal and waits for a clock signal. When the flip-flop 408 receives the clock signal, it changes its state and increments the decade counter 412. As NEs are added to the network, the decade counter 412 is incremented until the decade counter 412 counts 9999. (Note: as stated before, only four positions of the decade counter 412 are used to count the NEs and the remaining position is used to indicate its state). When the decade counter counts 9999 (i.e., the maximum relative count in case=1 has been reached), the result is stored in the result storage 420.

When the next NE is added to the network, the decade counter 412 moves to case=2 (of state=1). The case is moved to the next case because the maximum relative count in case=1 has been reached. At this point, all four positions of the decade counter 412 that are used to count the NEs are initialized to 0. Then, the least significant position of those four positions is incremented by 1 to indicate that a new NE has been added to the network.

In case=2, state=1, the decade counter 412 is incremented as NEs are added to the network. When the relative count reaches 9999 (i.e., the maximum relative count in case=2 has been reached), the full adder 416 adds this relative count to what has already been stored in the result storage 420 and stores the absolute count back in the result storage 420.

When the decade counter 412 counts 9999 in case=5, the maximum count in state=1 is reached. When the next NE is added, the state is moved to state=2. At this point, first, the case is initialized to case=1. The relative count is then initialized to count=0 and then it is immediately incremented by 1 to count=1 to indicate that a new NE has been added. The decade counter 412 begins to count as NEs are added. This process continues until the decade counter 412 counts 9999 in state=9, case=5. At this point, the result storage 420 reads 449955, and the maximum count using all 9 states has been reached.

The components of the circuit of FIG. 4 are controlled by a controller 424, which may be a hardware state machine or a software executing in a computer. The controller 424 causes the circuit of FIG. 4 to operate as described above.

Figure 5:
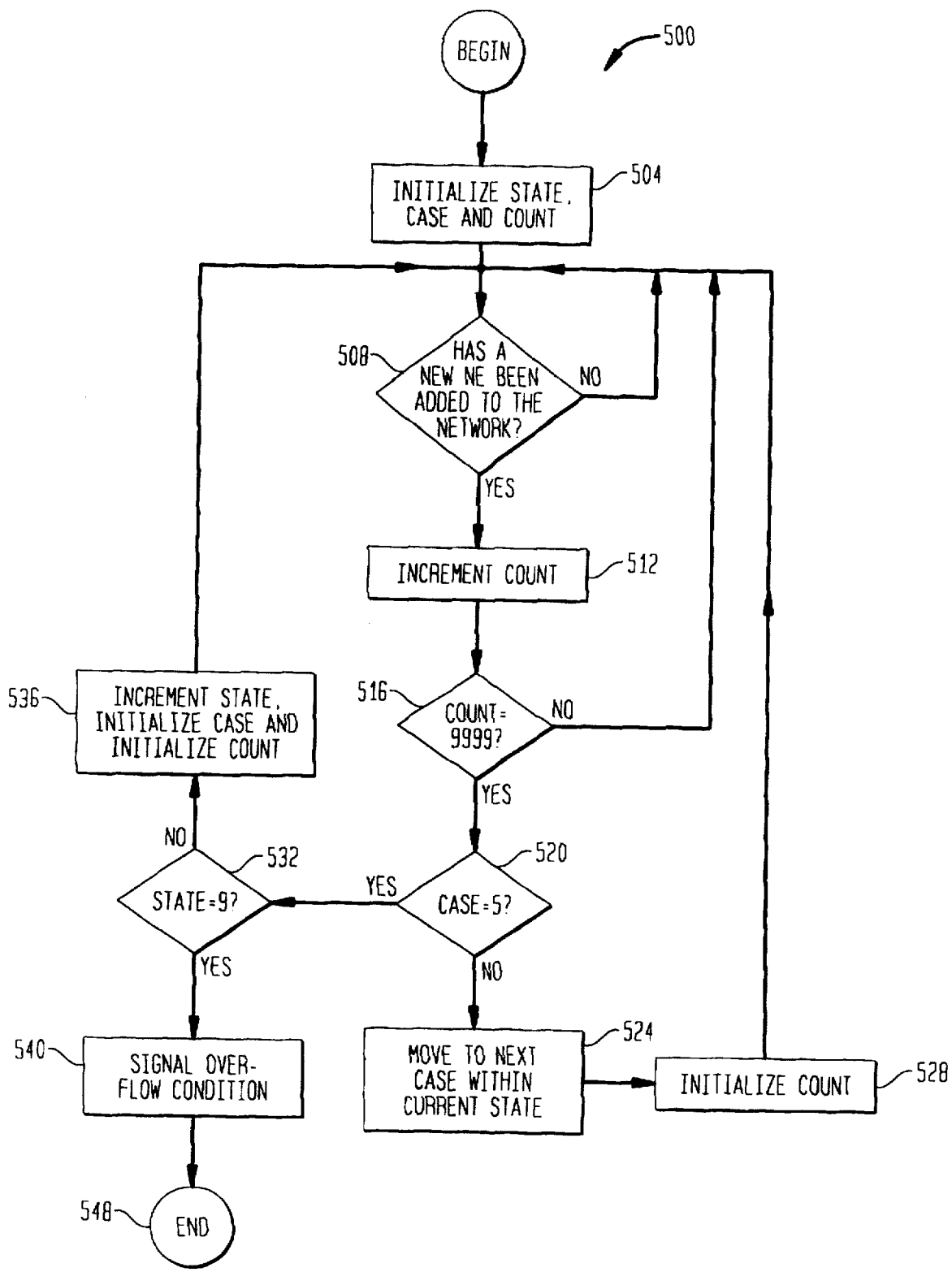
FIG. 5 illustrates a flow diagram of a method for keeping track of the network elements in a network using the five position register of FIG. 1.

FIG. 5 illustrates a flow diagram 500 of the method for keeping track of the NEs. For illustrative purposes, it is assumed that the register 100 is used to count the NEs. As stated before, the register 100 uses one of the 5 positions to indicate the state and uses the remaining 4 positions to maintain a relative count of the NEs. Although a 5 position register is used in this example embodiment, the present invention can easily be expanded to a register having n positions, n being any integer. As noted above, the register 100 represents the decade counter 412 in the circuit of FIG. 4.

Referring to FIG. 5, in step 504, the state, case and count of the register is initialized. In this step, the state is initialized to state=1, the case is initialized to case=1 and the count is initialized to count=0. In step 508, it is determined if a new NE has been added (i.e., whether the input switch 404 has received a signal). If a new NE has not been added, the flow returns to step 508. If a new NE has been added, the flow moves to step 512, where the count is incremented by 1 (i.e., the output of the D flip-flop 408 causes the decade counter 412 to increment by 1). In step 516, it is determined if the relative count=9999 (i.e., if the relative count is equal to $10^{n-1}-1$). If the relative count=9999, the maximum relative count within the case has been reached. Thus, it is necessary to change the case. If the relative count is less than 9999, the maximum relative count within the case has not been reached. Thus, the flow returns to step 508. If the relative count=9999, the flow moves to step 520 where it is determined if the case=5 (i.e., has the maximum case of the current state been reached). If the case is not equal to 5 (i.e., there are more cases in the current state), the register moves to the next case within the current state in step 524. Next, the flow moves to step 528 where the count is initialized and the flow returns to step 508. If in step 520, it is determined that case=5 (i.e., the maximum case in the state has been reached), the flow moves to step 532 where it is determined if the state=9 (i.e., has the maximum state been reached). If the state is not equal to 9, the flow moves to step 536 where the state is incremented by 1, the case is initialized to 1 and the count is initialized to 0, and the flow returns to step 508.

If it is determined that the state=9 in step 532, the flow moves to step 540. In step 540, a signal overflow condition is indicated and the flow moves to step 540 where the count is terminated.

Essentially, the above described steps are implemented in the embodiment of FIG. 4 by using the full adder 416 to add the contents of the decade counter 412 to the contents of the result storage 420 whenever the decade counter 412 is equal to 9999. The decade counter 412 is then set to 0.

While the preferred embodiment of the present invention has been described above, it should be understood that it has been presented by way of example only, and not limitation. Thus, the breadth and scope of the present invention should not be limited by the above-described exemplary embodiment, but should be defined only in accordance with the following claims and their equivalents.

What is claimed is:

1. A method for keeping track of network elements (NEs) in a network, comprising the steps of:
   (1) initializing a state, a case and a relative count of a register;
   (2) determining if a NE has been added to the network;
   (3) if a NE has not been added to the network, returning to step (2);
   (4) if a NE has been added to the network, then incrementing said relative count by 1;
   (5) determining if said relative count is equal to a maximum relative count;
   (6) if said relative count is not equal to said maximum relative count, then returning to step (2);
   (7) if said relative count is equal to said maximum relative count, then determining if said case is equal to a maximum case;
   (8) if said case is not equal to said maximum case, then moving to the next case within a current state, initializing said relative count and returning to step (2);
   (9) if said case is equal to said maximum case, then determining if said state is equal to a maximum state;
   (10) if said state is equal to said maximum state, then indicating a signal overflow condition; and
   (11) if said state is not equal to said maximum state, then incrementing said state by 1, initializing said case and said relative count and returning to step (2).

2. An apparatus for keeping track of network elements (NEs) in a network, comprising:
   an input switch coupled to said network;
   a latch coupled to said input switch;
   a decade counter coupled to said latch, said decade counter having a register, said decade counter maintaining a relative count of the NEs;
   a full adder coupled to said decade counter;
   a result storage coupled to said full adder, said result storage maintaining a total count of the NEs, said full adder adding said relative count to said total count in order to update said total count; and
   a controller coupled to said decade counter, said full adder and said result storage, said controller comprising:
   means for initializing a state, a case and said relative count of said register;
   means for determining if a NE has been added to the network;
   means for incrementing said relative count by 1 if a NE has been added to the network;
   means for determining if said relative count is equal to a maximum relative count;
   means for determining if said case is equal to a maximum case if said relative count is equal to said maximum relative count;
   means for moving to the next case within a current state and initializing said relative count if said case is not equal to said maximum case;
   means for determining if said state is equal to a maximum state if said case is equal to said maximum case;
   means for indicating a signal overflow condition if said state is equal to said maximum state; and
   means for incrementing said state by 1, and initializing said case and said relative count if said state is not equal to said maximum state.

3. A system for keeping track of network elements (NEs) in a network, comprising:
   an operations controller (OPC) coupled to said NEs;
   a network manager coupled to said OPC, said network manager comprising:
   means for initializing a state, a case and a relative count of a register;
   means for determining if a NE has been added to the network;
   means for incrementing said relative count by 1 if a NE has been added to the network;
   means for determining if said relative count is equal to a maximum relative count;
   means for determining if said case is equal to a maximum case if said relative count is equal to said maximum relative count;
   means for moving to the next case within a current state and initializing said relative count if said case is not equal to said maximum case;
   means for determining if said state is equal to a maximum state if said case is equal to said maximum case;
   means for indicating a signal overflow condition if said state is equal to said maximum state; and
   means for incrementing said state by 1, and initializing said case and said relative count if said state is not equal to said maximum state.

4. A method of using a n-position register as a counter, the n-position register having n positions where n is greater than or equal to two, the n positions including a first position and a last position, each of the n positions having a value, comprising the steps of:
   (1) selecting the first position of the n-position register, the n-position register having n−1 remaining positions, each selected position representing a case, the value of said selected position representing a state, said n−1 remaining positions representing a relative count;
   (2) initializing said state;
   (3) initializing said relative count;
   (4) incrementing said relative count in response to occurrence of a pre-determined event;
   (5) determining if said relative count is equal to a maximum relative count;
   (6) if said relative count is not equal to said maximum relative count, then returning to step (4);
   (7) if said relative count is equal to said maximum relative count, then determining if said selected position is the last position of the n-position register;

(8) if said selected position is not the last position of said n-position register, then selecting a next position of said n-position register to indicate said case, initializing said selected position with said state, initializing said remaining n-1 positions with said relative count, and returning to step (4);

(9) if said selected position is the last position, then determining if said state is equal to a maximum state;

(10) if said state is not equal to a maximum state, then incrementing said state, selecting said first position as said case, initializing said selected position with said state, initializing said remaining n-1 positions with said relative count, and returning to step (4); and

(11) if said state is equal to said maximum state, then triggering an overflow condition.

5. A method of using a n-position register as a counter, the n-position register having n positions, the n positions including a first position and a last position, each of the n positions having a value, comprising the steps of:

(1) selecting the first position of the n-position register, the n-position register having n-1 remaining positions, each selected position representing a case, the value of said selected position representing a state, said n-i remaining positions representing a relative count;

(2) initializing said state;

(3) initializing said relative count;

(4) incrementing said relative count in response to occurrence of a pre-determined event;

(5) determining if said relative count is equal to a maximum relative count;

(6) if said relative count is not equal to said maximum relative count, then returning to step (4);

(7) if said relative count is equal to said maximum relative count, then determining if said state is equal to a maximum state;

(8) if said state is not equal to said maximum state, then incrementing said state, and returning to step (4);

(9) if said state is equal to said maximum state, then determining if said selected position is the last position of the n-position register;

(10) if said selected position is not the last position of the n-position register, then selecting a next position of said n-position register to indicate said case, and returning to step (2); and

(11) if said selected position is said last position of the n-position register, then triggering an overflow condition.

6. A counter circuit comprising:

a n-position register, said n-position register having n positions, a selected one of said n positions representing a case, said selected position for storing a value indicating a state, said case initialized to a first position of said n-position register, said n-position register having n-1 remaining positions, said n-1 remaining positions for storing a value indicating a relative count;

an input switch operable to receive an incoming signal;

means coupled between said input switch and said n-position register operable to increment said relative count in response to said incoming signal;

adder means coupled to said n-position register;

storage means coupled to said adder means;

a controller coupled to said n-position register, said adder means, and said storage means and operable in response to said incoming signal to determine if said relative count is equal to a maximum count and further operable if said relative count is equal to said maximum count:

to signal said adder means to add said relative count to said storage means;

to determine if said case is equal to a maximum case;

to determine if said state is equal to a maximum state;

if said case is equal to said maximum case and said state is equal to said maximum state, to trigger an overflow signal;

if said case is equal to said maximum case and said state is not equal to said maximum state, to increment said state, to increment said case by selecting said first position in said n-position register to indicate said case, to initialize said selected position with said state;

if case is not equal to said maximum case, to increment said case by selecting a next position in said n-position register to indicate said case, to initialize said selected position with said state; and to initialize said relative count in said remaining n-1 positions.

7. A counter circuit comprising:

a n-position register, said n-position register having n positions, a selected one of said n positions representing a case, said selected position for storing a value indicating a state, said case initialized to a first position of said n-position register, said n-position register having n-1 remaining positions, said n-1 remaining positions for storing a value indicating a relative count;

an input switch operable to receive an incoming signal;

means coupled between said input switch and said n-position register operable to increment said relative count in response to said incoming signal;

adder means coupled to said n-position register;

storage means coupled to said adder means;

a controller coupled to said n-position register, said adder means, and said storage means and operable in response to said incoming signal to determine if said relative count is equal to a maximum count and further operable if said relative count is equal to said maximum count:

to signal said adder means to add said relative count to said storage means;

to determine if said state is equal to a maximum state;

to determine if said case is equal to a maximum case;

if said state is equal to said maximum state and said case is equal to said maximum case, to trigger an overflow signal;

if said state is equal to said maximum state and said case is not equal to said maximum case, to increment said case by selecting a next position in said n-position register to indicate said case, to initialize said state;

if said state is not equal to said maximum state, to increment said state; and to initialize said relative count in said remaining n-1 positions.

* * * * *